Dec. 15, 1970   C. R. PROCTER   3,546,987
ROTARY METALWORKING APPARATUS
Filed May 21, 1969   2 Sheets-Sheet 1

INVENTOR
CHARLES R. PROCTER
BY
Woodard Weikart Emhardt & Naughton
Attorneys

Dec. 15, 1970  C. R. PROCTER  3,546,987
ROTARY METALWORKING APPARATUS
Filed May 21, 1969  2 Sheets-Sheet 2

INVENTOR
CHARLES R. PROCTER
BY
Woodard Weikart Emhardt & Naughton
Attorneys

United States Patent Office 3,546,987
Patented Dec. 15, 1970

3,546,987
ROTARY METALWORKING APPARATUS
Charles R. Procter, R.R. 1, Greenwood, Ind. 46142
Filed May 21, 1969, Ser. No. 826,444
Int. Cl. B23b *3/04, 5/14*
U.S. Cl. 82—58                                         3 Claims

ABSTRACT OF THE DISCLOSURE

Disclosed is an apparatus for trimming metal parts (burr removal, etc.) in which the work to be trimmed is held in a die, with the portion to be trimmed protruding from the die, and a trimming tool is rotated axially over the face of the work with the tool being urged under hydraulic pressure and hence progressively displaced radially with relation to its axis of rotation to sever the portion of the work to be trimmed from the work.

BACKGROUND OF THE INVENTION

Cold-working of metal by flow-turning, the cold plastic deformation of a blank into a thin hollow symmetrical part, has become an important segment of the metalworking industry. Parts thus formed and punch-press or screw-machine parts often carry objectionable burrs, or are best formed by initially leaving on the part a flange or surface extension which must be subsequently trimmed off the part to finish it as to dimension or surface texture.

Such trimming or cutting operations, in the past, have been carried out by various schemes. Lathe type cut off tools have been utilized, sawing, disc cutting, die type cutting and shearing are all practiced in performing trimming or cutting operations.

SUMMARY OF THE INVENTION

The concept of the present invention provides for the performing of trimming operations economically by relatively simple apparatus in which hydraulic pressure is directly applied to the trimming tool as it is moved in a circular path over the adjacent surface of the portion of the workpiece to be severed or trimmed from the work, the trimming operation being conveniently controlled by coordinating the hydraulic pressure on the trimming tool with the characteristics, such as hardness, of the material from which the workpiece is fabricated.

DESCRIPTION OF THE PREFERRED EMBODIMENT

Figure 1:
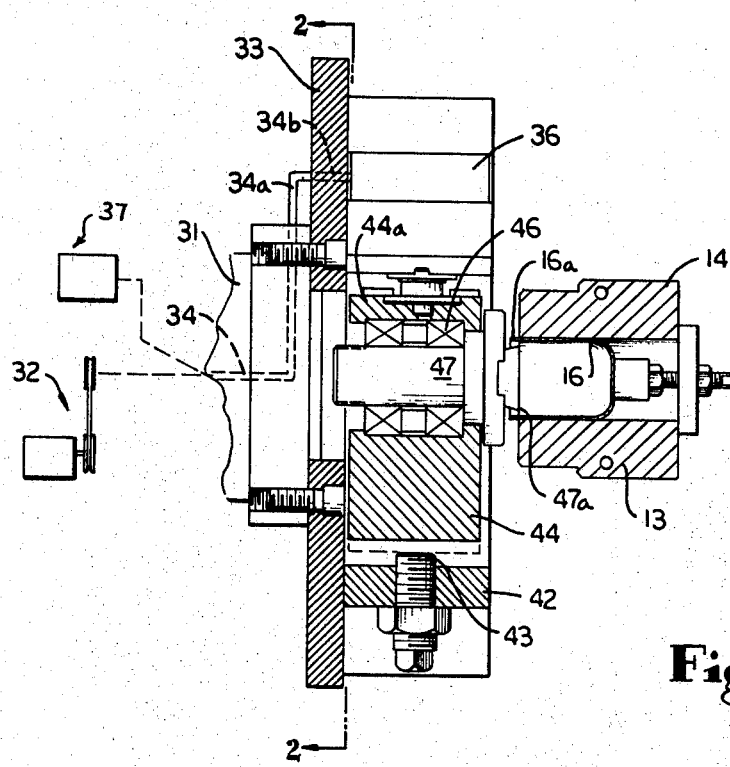
FIG. 1 is a side sectional view of the apparatus embodying the present invention.
Figure 2:
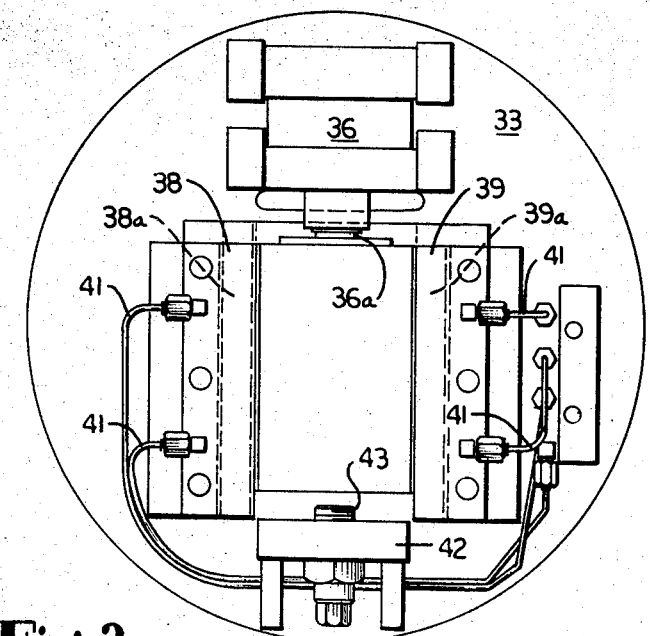
FIG. 2 is a front view of a portion of the apparatus shown in FIG. 1 and taken generally along the line 2—2 of FIG. 1.
Figure 3:
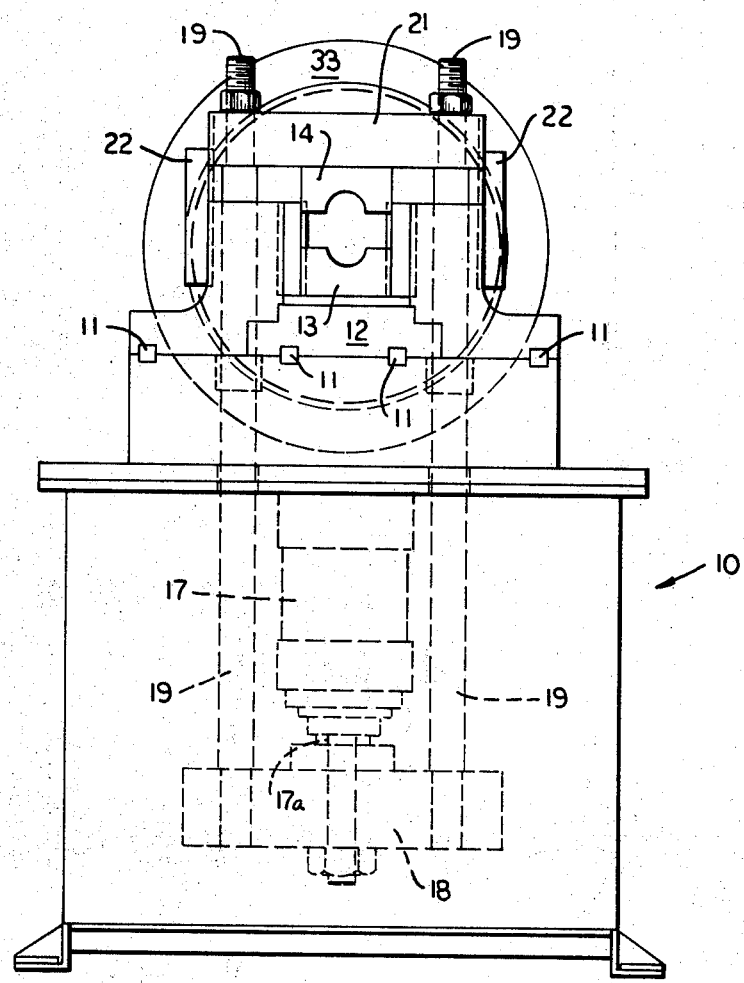
FIG. 3 is an end view of the apparatus shown in FIG. 1 but additionally showing the mounting platform for the apparatus.

Referring initially to FIGS. 1, 2 and 3, the trimming and cutting tool and the work holding assembly of the present invention is supported on a table or platform indicated generally at 10 in FIG. 3. Supported on the platform are rails 11 (FIG. 3) which extend horizontally and permit horizontal, adjustable positioning of a die holder 12. The die holder carries a lower die 13 and an upper die 14 each of which carry semi-circular cavities which, when the dies are closed, hold a tubular workpiece indicated at 16 in FIG. 1.

As shown in FIG. 3, the upper die is in raised position with respect to the lower die. It is moved and held in closed or work clamping position by a hydraulic power means taking the form of the hydraulic cylinder 17 (FIG. 3). The hydraulic cylinder is connected to a suitable source of pressurized hydraulic fluid (not shown) and has a thrust member 17a which is adjustably secured to a horizontal bar 18. Guide rods 19 are carried by the bar and extend through apertures in the platform and are adjustably fastened upon a clamp bar 21 at their upper ends. The clamp bar 21 is rigidly secured to the upper die 14 so that when the thrust member 17a of the hydraulic cylinder is extended, the bar 18 is moved downwardly closing the upper die 14 against the lower die 13. Motion of the die is guided by the bracket guide members 22 (FIG. 3).

The trimming tool holding portion of the assembly will now be described with particular reference to FIGS. 1 and 2. As may be seen in FIG. 1, the drive shaft 31 is rotated by any suitable power source, indicated schematically at 32, and the extending end of the power shaft has secured thereto a face plate 33 which rotates with the shaft. A passage 34 extends through the shaft and radially outwardly adjacent the plate 33 and communicates with a tube 34a which extends into communication with an aperture 34b in the plate, the tube and passages providing access for pressurized hydraulic fluid to the pressure side of a hydraulic power means such as the hydraulic cylinder 36. The passage 34 may be connected to a suitable source of hydraulic fluid under pressure as indicated schematically at 37 in FIG. 1.

As may best be seen in FIG. 2, spaced parallel guides 38 and 39 are rigidly secured to the face of the plate 33, the guides forming parallel guideways 38a and 39a underlying the inwardly extending flange portions of the guides 38 and 39, respectively. Lubrication tubing 41 serves to conduct lubricating oil to the guideways. Opposite the hydraulic cylinder 36 a bracket 42 extends rigidly from the face of the plate 33 and carries an adjustable stop 43 which is adapted to limit the downward movement of the mandrel holder block, to be subsequently described with reference to FIG. 1.

As will be evident from a comparison of FIGS. 1 and 2, the mandrel holder block 44 and the trimming tool which it carries are omitted from FIG. 2 so that the position of the guideways 38a and 39a in which the mandrel holder block moves can be more clearly shown. The mandrel holder block 44 of FIG. 1 carries a bearing 46 and the upper portion of the block 44, indicated at 44a in FIG. 1 is engaged by the thrust member 36a of the hydraulic cylinder 36. The bearing 46 supports the mandrel portion of a cutting tool 47 and the cutting edge, adapted to engage the work, is indicated at 47a. It will be understood that the bearing 46 permits the cutting tool to rotate freely with respect to the block 44.

Figure 4:
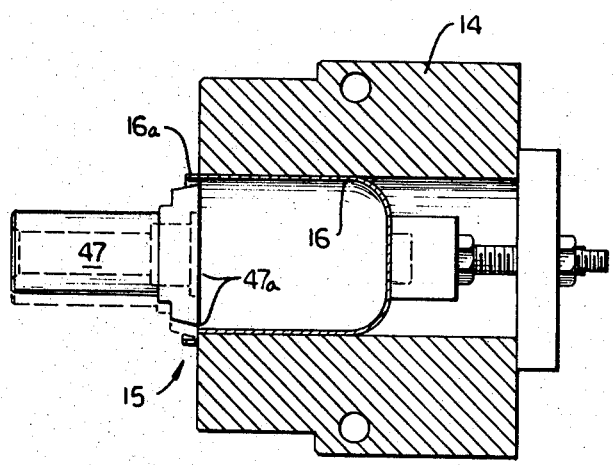
FIG. 4 is an enlarged sectional view of the cutting tool, workpiece and work holding die shown in FIG. 1 but illustrating, in broken lines, the radial movement of the tool.

In operation, as will be evident from FIGS. 1 and 4, the tubular workpiece 16 is positioned and clamped within the dies 16 and 13 so that the portion, indicated at 16a, which is to be trimmed from the workpiece extends from the die. The tubular workpiece 16, it will be noted, is clamped in the dies so that its central longitudinal axis coincides with the axis of rotation of the shaft 31 and, consequently, the plate 33. Initially, the tool 47 is positioned at the open end of the workpiece with its circular cutting edge 47a substantially aligned with the adjacent ends of the die members 13 and 16, the cutting edge 47a and the die members having a horizontal clearance (as viewed in FIG. 4) of approximately two or three thousandths of an inch. Under these initial conditions, with the face plate 33 rotating about the axis of shaft 31, since the block 44 is in a position such that the axis of the tool 47 coincides with the axis of the shaft 31, there will be no osccillattory motion of the tool. When the hydraulic cylinder 36 is pressurized, however, the block 44 will be moved downwardly, as viewed in FIG. 2, in the guides 38 and 39 until the cutting edge 47a of the tool engages the inner surface of the tubular workpiece 16, the cutting edge being urged against the workpiece by the hydraulic pressure exerted by the cylinder 36. The downwardly displaced position of the tool 47 is illustrated in broken lines in FIG. 4 and, since the axis of the tool is displaced off center from the axis of the shaft 31, the cutting edge 47a of the tool will traverse, in a circular path, the inner surface of the workpiece 16 until the portion 16a of the workpiece is severed as illustrated at 15 in FIG. 4. As the cutting edge 47a of the tool is moved in its circular orbit within the tubular workpiece, since the tool is mounted in the bearing 46, the tool is free to rotate in its travel around the inner surface of the workpiece. The portion 16a (FIG. 4) of the workpiece is thus trimmed by the rotary motion of the cutting tool 47 as it orbits the inner face of the workpiece, the cutting force being applied by the hydraulic cylinder 36 and acting against the force exerted by the hydraulic cylinder 17 (FIG. 3) which holds the dies closed. Since the tool is urged into cutting contact with the work by hydraulic pressure, tubular workpieces of round, oval or rectangular cross section can be trimmed so long as the maximum excursion of the tool from the axis of the shaft 31 occurs within the limit set by the stop abutment 43.

What is claimed is:

1. A metal trimming or cutting apparatus comprising a face plate adapted to be rotated on an axis normal to the plane of one face of the plate, a cutting tool extending outwardly from said face of the plate, mounting means for movably supporting the cutting tool on the plate, hydraulic power means mounted on the plate and adapted to cooperate with said mounting means to shift the position of said cutting tool radially across said face of the plate, a stationary die adjacent said plate adapted to hold a tubular workpiece with its central axis coinciding with the axis of rotation of said face plate and with a portion to be severed from the workpiece extending out of the die and toward the face plate, said tool having a cutting edge urged into engagement with the inner surface of said tubular workpiece by said hydraulic power means as said face plate is rotated to trim said extending portion from the workpiece.

2. A metal trimming or cutting apparatus as claimed in claim 1 in which said mounting means for the cutting tool comprises: spaced parallel guides extending chordally over said face of the rotating plate, and a mandrel holder block adapted to slide within said spaced guides, said guides being positioned on said plate so that a point on said block equidistant from said guides moves radially over the face of the plate as the block moves within said guides, bearing means carried by said block and supporting said tool for free rotation on an axis passing through said point on the block and parallel to the said axis of rotation of the face plate, said block being adapted to be moved in said guides by said hydraulic power means.

3. A metal trimming or cutting apparatus as claimed in claim 2 in which said hydraulic power means takes the form of a hydraulic cylinder rigidly mounted on said face plate and having a thrust member engaging said mandrel holder block.

References Cited

UNITED STATES PATENTS

| | | | |
|---|---|---|---|
| 1,807,671 | 6/1931 | Phelps | 82—58 |
| 2,298,366 | 10/1942 | Gladfelter et al. | 82—58X |
| 3,186,029 | 6/1965 | Joseph | 82—57X |
| 3,359,841 | 12/1967 | Cvacho et al. | 82—82 |
| 3,364,709 | 1/1968 | Scann | 82—57X |

HARRISON L. HINSON, Primary Examiner

U.S. Cl. X.R.

87—82